(12) United States Patent
Kumagawa et al.

(10) Patent No.: US 11,303,585 B2
(45) Date of Patent: Apr. 12, 2022

(54) TRANSMISSION DEVICE AND RESOURCE ALLOCATION METHOD

(71) Applicant: Nippon Telegraph and Telephone Corporation, Tokyo (JP)

(72) Inventors: Shigemasa Kumagawa, Tokyo (JP); Ken Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/290,397

(22) PCT Filed: Oct. 18, 2019

(86) PCT No.: PCT/JP2019/041190
§ 371 (c)(1),
(2) Date: Apr. 30, 2021

(87) PCT Pub. No.: WO2020/090529
PCT Pub. Date: May 7, 2020

(65) Prior Publication Data
US 2021/0359960 A1 Nov. 18, 2021

(30) Foreign Application Priority Data
Oct. 30, 2018 (JP) .............................. JP2018-204334

(51) Int. Cl.
*H04L 12/861* (2013.01)
*H04L 49/90* (2022.01)
(52) U.S. Cl.
CPC ...... *H04L 49/9068* (2013.01); *H04L 49/9084* (2013.01)
(58) Field of Classification Search
CPC . H04L 49/9068; H04L 49/9084; H04L 47/50; H04L 49/90; H04L 2012/5681
(Continued)

(56) References Cited

U.S. PATENT DOCUMENTS 10,540,101 B1 * 1/2020 Matthews ............. G06F 3/0619
11,171,890 B1 * 11/2021 Matthews ............... H04L 47/28
(Continued)

FOREIGN PATENT DOCUMENTS

JP  2004-272905  9/2004
JP  2015-57931   3/2015

OTHER PUBLICATIONS

Joshi et al., "BurstRadar: Practical Real-time Microburst Monitoring for Datacenter Networks," Proceedings of the 9th Asia-Pacific Workshop on Systems ACM, 2018, 8 pages.
(Continued)

*Primary Examiner* — Robert J Lopata
(74) *Attorney, Agent, or Firm* — Fish & Richardson P.C.

(57) ABSTRACT

[Problem] To allocate IFs to be used in accordance with buffers such that no packet loss occurs in a case in which the transfer apparatus that performs packet transfer includes as many buffers with grouped interfaces (IFs) mounted in units of groups thereon as the number of groups.
[Solving Means] A packet transfer apparatus 10C has a plurality of buffers 11a to 11n mounting IFs in units of groups and performs, when the traffic amount at the time of packet transfer of the IFs of each of the buffers exceeds maximum transfer capacity of the IFs, buffering packets corresponding to the exceeding traffic amount in the buffers. An IF allocation unit 23 included in the transfer apparatus 10C selects, in a case in which IF groups with no occurrence of any loss indicating packet discarding are present at the time of the packet transfer in the IFs for a unit time from among all the IF groups, an IF group with a longest non-occurrence time of the buffering from among the IF groups with no occurrence of any loss and performs IF allocation of allocating traffic of packets to the IFs in the selected IF groups.

12 Claims, 4 Drawing Sheets

(58) Field of Classification Search
USPC .......................................................... 370/412
See application file for complete search history.

(56) References Cited

U.S. PATENT DOCUMENTS

| | | |
|---|---|---|
| 2004/0210623 A1 | 10/2004 | Hydrie et al. |
| 2007/0053296 A1* | 3/2007 | Yazaki ................... H04L 47/10 370/235 |
| 2014/0043965 A1 | 2/2014 | Tabuchi |
| 2018/0101498 A1* | 4/2018 | Cosby ................. G06F 13/4068 |
| 2020/0136986 A1* | 4/2020 | Southworth ........ H04L 67/2842 |
| 2020/0244601 A1* | 7/2020 | Gopalarathnam .. H04L 49/3018 |
| 2020/0396158 A1* | 12/2020 | Merdler .............. H04L 49/3027 |

OTHER PUBLICATIONS

Openconfig.net, [online], "Streaming telemetry," 2016, retrieved on Mar. 26, 2021, retrieved from URL<http://www.openconfig.net/projects/telemetry/>, 1 page.

* cited by examiner

TRANSMISSION DEVICE AND RESOURCE ALLOCATION METHOD

CROSS-REFERENCE TO RELATED APPLICATIONS

This application is a National Stage application under 35 U.S.C. § 371 of International Application No. PCT/JP2019/041190, having an International Filing Date of Oct. 18, 2019, which claims priority to Japanese Application Serial No. 2018-204334, filed on Oct. 30, 2018. The disclosure of the prior application is considered part of the disclosure of this application, and is incorporated in its entirety into this application.

TECHNICAL FIELD

The present invention relates to a transfer apparatus that performs path control and packet transfer and to a resource allocation method for allocating interfaces (IFs) to be used in accordance with buffers of the transfer apparatus, in an internet protocol (IP) network in which packet transfer is performed, especially when a plurality of communication services are multiplexed in an identical IP network.

BACKGROUND ART

In an IP network (also referred to as a network), there are cases in which a packet loss (packet discarding) occurs in a transfer apparatus due to burst traffic (also referred to as a burst) that is a temporary and sudden increase in traffic. Commonly, the packet loss (also referred to as a loss) caused by the burst is curbed to the maximum extent in a transfer apparatus. To this end, packet buffering is performed by buffers using queues, which are called packet buffers. The buffering is executed when the traffic amount at the time of packet transfer in a packet transfer interface (IF) mounted on the buffer exceeds a maximum transfer capacity of the IF, by inputting packets corresponding to the exceeding traffic amount to the buffer.

IFs are physical IFs such as a packet transfer port connected to the network. Optical fibers and metal cables connected to the network are connected to the IFs. Note that there are also cases in which the IFs indicate logical IFs separated by a virtual local area network (VLAN) or the like.

Typically, the amount of packets that can be buffered in buffers of a transfer apparatus depends on the buffer capacity of the buffers and is thus limited. As the buffers, the shared buffer 11 illustrated in FIG. 5 and the plurality of buffers 11a, 11b, . . . , 11n illustrated in FIG. 6 are exemplified.

Figure 5:
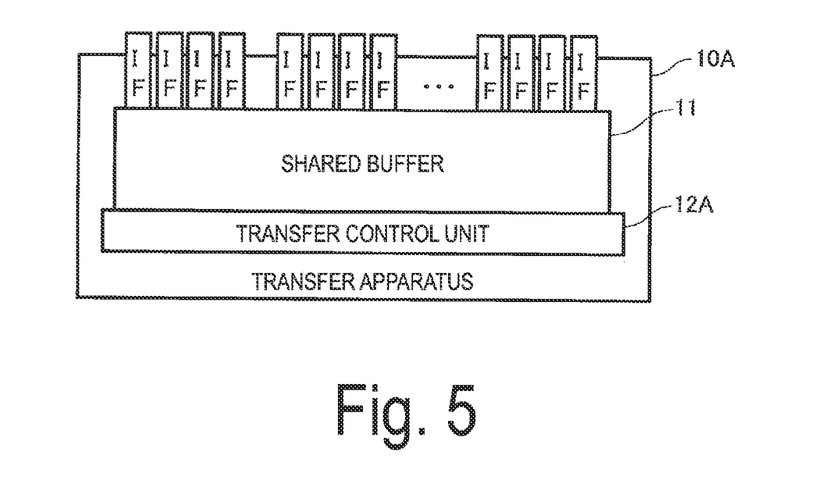
FIG. 5 is a block diagram illustrating a configuration of a shared buffer in the related art.

The shared buffer 11 illustrated in FIG. 5 is connected to and mounted on a transfer control unit 12A that performs packet transfer control in a transfer apparatus 10A. All IFs connected to a network are mounted on the shared buffer 11 in advance such that the IFs can be shared.

Figure 6:
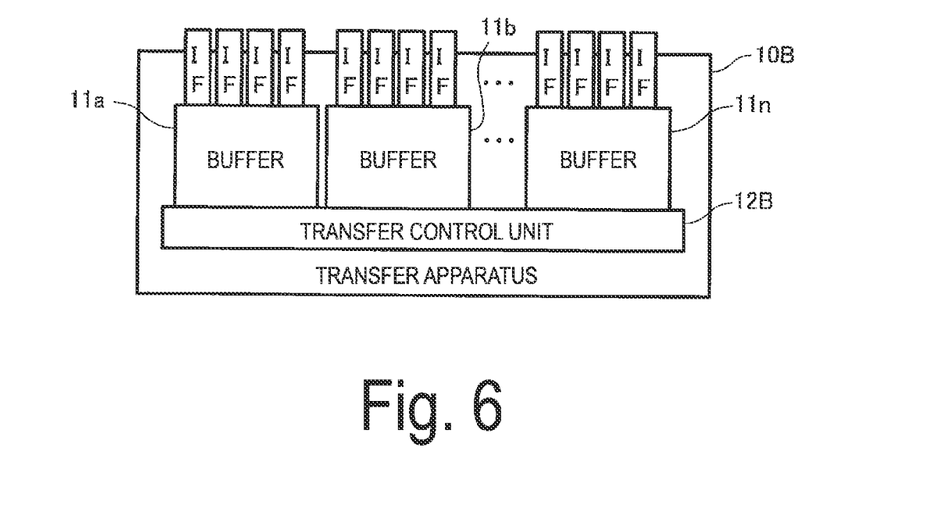
FIG. 6 is a block diagram illustrating a plurality of buffers in each IF group in the related art.

The buffers 11a to 11n illustrated in FIG. 6 are divided into the number of groups (n groups in this example) that is obtained by dividing all the IFs into a plurality of groups in accordance with dependence on connecting destinations or the like, and the buffers 11a to 11n individually include IFs mounted in units of groups thereon in advance. A set of IFs in one group unit will be referred to as an IF group. The buffer capacity of each of the buffers 11a to 11n is determined in advance in accordance with the number of mounted IFs (four IFs in this example) in each IF group. Also, the buffers 11a to 11n are connected to and mounted on a transfer control unit 12B in a transfer apparatus 10B.

Note that the transfer control units 12A (FIG. 5) and 12B (FIG. 6) are composed of application specific integrated circuits (ASICs) or the like.

In regard to the aforementioned burst, a temporal change thereof can typically be visualized by observing (detecting) a counter value (traffic amount) of packets input to each IF. However, a burst that is called microburst traffic (also referred to as micro traffic) in which traffic suddenly increases only in a significantly short period in units of seconds or the like is present, among types of bursts. It is not possible to check details of the micro traffic with an ordinary visualization method due to its low time resolution.

In addition, several methods for visualizing the presence of the micro traffic have also been examined. Since a remaining amount of buffer capacity decreases in a case in which the burst has occurred, for example, the micro traffic can be visualized by monitoring a use rate of buffer capacity. However, it is not possible to constantly monitor the use rate of buffer capacity due to restrictions of hardware in many cases.

Thus, methods for visualizing a temporary change in the burst as disclosed in Patent Literature 1 and Non Patent Literature 1 have been reviewed. For example, there is a method of constantly distributing delay measuring packets based on the fact that a transfer delay occurs when the use rate of buffer capacity increases. As disclosed in Non Patent Literature 2, there is also a method of estimating whether a burst has occurred by acquiring a traffic amount at significantly short intervals using a monitoring technique performed with simple processing, and regarding a case in which the traffic amount is close to a limit value as a case in which the burst has occurred.

Here, resources in resource allocation described in this specification are IFs including buffers. The resource allocation is IF allocation of allocating traffic of packets to the IFs. This IF allocation is IF expansion or the like in which unused IFs are used in response to a resource allocation command from a higher-order apparatus.

As a method for allocating resources in an IP network, a method of estimating a congestion state of the network from a packet loss amount and the like, and selecting an accommodation apparatus (corresponding to a buffer with a plurality of IFs mounted thereon) suitable for solving the loss, or selecting a transfer path as disclosed in Patent Literature 2 is known.

CITATION LIST

Patent Literature

Patent Literature 1: JP 2015-057931 A
Patent Literature 2: JP 2004-272905 A

Non Patent Literature

Non Patent Literature 1: Joshi, Raj, et al. "BurstRadar: Practical Real-time Microburst Monitoring for Datacenter Networks." Proceedings of the 9th Asia-Pacific Workshop on Systems. ACM, 2018.
Non Patent Literature 2: "Streaming telemetry", [online], 2016 OpenConfig, [retrieved on Oct. 16, 2018], internet <URL: http://www.openconfig.net/projects/telemetry/>

SUMMARY OF THE INVENTION

Technical Problem

As described above, in the buffers for curbing a packet loss, since the buffer capacity of one buffer is defined in advance, the buffer capacity is limited. Thus, it is possible to consider that the loss amount can be further curbed in the transfer apparatus 10B provided with the buffers 11a to 11n for each of the IF groups as illustrated in FIG. 6 by appropriately selecting what traffic is to be accommodated in which of the IF groups.

However, in the resource allocation method in the related art as described above, optimization of resource allocation (IF allocation) in consideration only of the loss amount is performed in most cases, and IF allocation in consideration of the use rate of buffer capacity, which can also be considered as a sign of a loss, is not examined. In other words, since optimal IF allocation is performed after a loss is detected, there is a problem in which occurrence of a loss cannot be avoided.

The present invention was made in view of such circumstances, and an object thereof is to provide a transfer apparatus and a resource allocation method capable of allocating IFs to be used in accordance with buffers such that no packet loss occurs in a case in which the transfer apparatus that performs packet transfer includes as many buffers with grouped interfaces (IFs) mounted in units of groups thereon as the number of groups.

Means for Solving the Problem

As means for solving the aforementioned problem, the present invention according to first aspect provides a transfer apparatus that has a plurality of buffers, the plurality of buffers being an identical number with the number of groups, the groups being obtained by grouping a plurality of interfaces (IFs) for packet transfer in units of a number that is smaller than the number of the plurality of IFs, each of the plurality of buffers mounting IFs in units of groups, buffer capacity of each of the buffers being defined in accordance with the number of mounted IFs in units of groups, the transfer apparatus performing packet transfer to and from a network via the IFs in units of groups of each of the plurality of buffers, the transfer apparatus performing buffering packets corresponding to the exceeding traffic amount in a buffer of the plurality of buffers when a traffic amount at time of the packet transfer exceeds maximum transfer capacity of the IFs in units of groups, the transfer apparatus including an IF allocation unit configured to select, in a case in which, from among all IF groups of the transfer apparatus, IF groups in which a loss indicating packet discarding does not occur during the packet transfer in the IFs in units of groups for a unit time are present, an IF group with a longest non-occurrence time of the buffering from among the IF groups with no occurrence of any loss and perform IF allocation of allocating traffic of packets to IFs in units of groups in the IF group that is selected.

The invention according to seventh aspect provides a resource allocation method performed by a transfer apparatus that has a plurality of buffers, the plurality of buffers being an identical number with the number of groups, the groups being obtained by grouping a plurality of IFs for packet transfer in units of a number that is smaller than the number of the plurality of IFs, each of the plurality of buffers mounting IFs in units of groups, buffer capacity of each of the plurality of buffers being defined in accordance with the number of mounted IFs in units of groups, the transfer apparatus performing packet transfer to and from a network via the IFs in units of groups of each of the plurality of buffers, the transfer apparatus performing buffering packets corresponding to the exceeding traffic amount in a buffer of the plurality of buffers when a traffic amount at time of the packet transfer exceeds maximum transfer capacity of the IFs in units of groups, the resource allocation method including, by the transfer apparatus, detecting, from among all IF groups of the transfer apparatus, whether IF groups in which a loss indicating packet discarding does not occur during the packet transfer in the IFs in units of groups for a unit time are present, selecting, in a case in which the IF groups are detected to be present, an IF group with a longest non-occurrence time of the buffering from among the IF groups with no occurrence of any loss, and performing IF allocation of allocating traffic of packets to IFs in units of groups in the IF group that is selected.

According to the configuration of first aspect and the method of seventh aspect, it is possible to allocate ifs to be used in accordance with the buffers such that no packet loss occurs in a case in which the transfer apparatus that performs packet transfer includes as many buffers with the grouped IFs mounted in units of groups thereon as the number of groups.

The invention according to second aspect is the transfer apparatus according to first aspect, in which the IF allocation is processing of allocating the traffic to the IFs in units of groups after preprocessing is executed, the preprocessing being any one of IF expansion of bringing unused IFs in units of groups mounted on a buffer of the IF group that is selected into a used state, IF connecting destination change of changing the IFs in units of groups connected to the network to the IFs in units of groups of another buffer, and IF expansion/reduction of increasing or reducing the IFs in units of groups in use in the buffer that is selected.

With this configuration, it is possible to allocate IFs to be used in accordance with the buffers that are targets of the IF allocation on which any of the IF expansion, the IF connecting destination change, and the IF expansion/reduction has been performed.

The invention according to third aspect is the transfer apparatus according to first or second aspect, further including a management unit configured to detect whether a burst occurs, namely, whether burst traffic occurs when the traffic amount at the time of the packet transfer in the IFs in units of groups exceeds the maximum transfer capacity of the IFs in units of groups, store detected information regarding whether the burst occurs in a storage unit in units of the IF groups in association with time information regarding whether the burst occurs, detect whether the loss occurs at the time of the packet transfer in the IFs in units of groups, and store detected information regarding whether the loss occurs in a storage unit in units of the IF groups in association with time information regarding whether the loss occurs, in which the IF allocation unit regards and selects, when detecting presence of IF groups with no occurrence of any loss based on the information, which is stored in a storage unit, regarding whether the loss occurs, an IF group with a minimum number of occurrences of the burst from among the IF groups with no occurrence of any loss as the IF group with a longest non-occurrence time of the buffering, based on the information regarding whether the burst occurs.

With this configuration, it is possible to regard and select an IF group with the minimum number of occurrences of the burst from among the IF groups with no occurrence of any loss as the IF group with the longest non-occurrence time of the buffering, based on the information regarding whether the loss occurs and the information regarding whether the burst occurs, with which the time information acquired by the management unit is associated. Calculation for the selection can be achieved with a simple calculation equation because an algorithm for the selection is simple. It is thus possible to perform the IF allocation such that a loss can be prevented in advance with the simple calculation when the IF allocation is performed.

The invention according to fourth aspect is the transfer apparatus according to first or second aspect, in which the IF allocation unit performs, in a case in which, from among all the IF groups in the transfer apparatus, IF groups in which a loss does not occur during the packet transfer in the IFs in units of groups for a unit time are not present, the IF allocation by selecting an IF group with a minimum number of occurrences of the loss from among all the IF groups.

With this configuration, it is possible to allocate IFs to be used in accordance with the buffers such that a packet loss is minimized.

The invention according to fifth aspect is the transfer apparatus according to second aspect, further including an estimation unit configured to estimate information regarding whether the burst occurs, with which time information regarding whether the burst occurs is associated, and information regarding whether the loss occurs, with which time information regarding whether the loss occurs is associated, from traffic characteristics of each of the IF groups after the preprocessing is executed, in which the IF allocation unit regards and selects, when detecting presence of IF groups with no occurrence of any loss from among the IF groups with the traffic characteristics estimated by the estimation unit, an IF group with a minimum number of occurrences of the burst from among the IF groups with no occurrence of any loss as an IF group with a longest non-occurrence time of the buffering.

With this configuration, it is possible to regard and select the IF group with the minimum number of occurrences of the burst from among the IF groups with no occurrence of any loss as the IF group with the longest non-occurrence time of the buffering when the presence of the IF groups with no occurrence of any loss is detected from among the IF groups with the traffic characteristics estimated by the estimation unit. Calculation for the selection can be achieved with a simple calculation equation because an algorithm for the selection is simple. It is thus possible to perform the IF allocation such that a loss can be prevented in advance with simple estimation calculation when the IF allocation is performed.

The invention according to sixth aspect is the transfer apparatus according to fifth aspect, in Which the IF allocation unit performs, in a case in which the presence of the IF groups with no occurrence of any loss is not detected from among the IF groups with the traffic characteristics estimated by the estimation unit, the IF allocation by selecting an IF group with a minimum number of occurrences of the loss from among all the estimated IF groups.

With this configuration, it is possible to allocate IFs to be used in accordance with the buffers such that a packet loss is minimized from among the IF groups with the traffic characteristics estimated by the estimation unit.

Effects of the Invention

According to the present invention, it is possible to provide a transfer apparatus and a resource allocation method of allocating IFs to be used in accordance with buffers such that no packet loss occurs in a case in which the transfer apparatus that performs packet transfer includes as many buffers with grouped interfaces (IFs) mounted in units of groups thereon as the number of groups.

DESCRIPTION OF EMBODIMENTS

Hereinafter, an embodiment of the present invention will be described swim reference to the drawings.

Configuration of Embodiment

Hereinafter, an embodiment of the present invention will be described with reference to the drawings. Here, in all the drawings of the present specification, components having corresponding functions are denoted by the same reference signs and description will be appropriately omitted.

Figure 1:
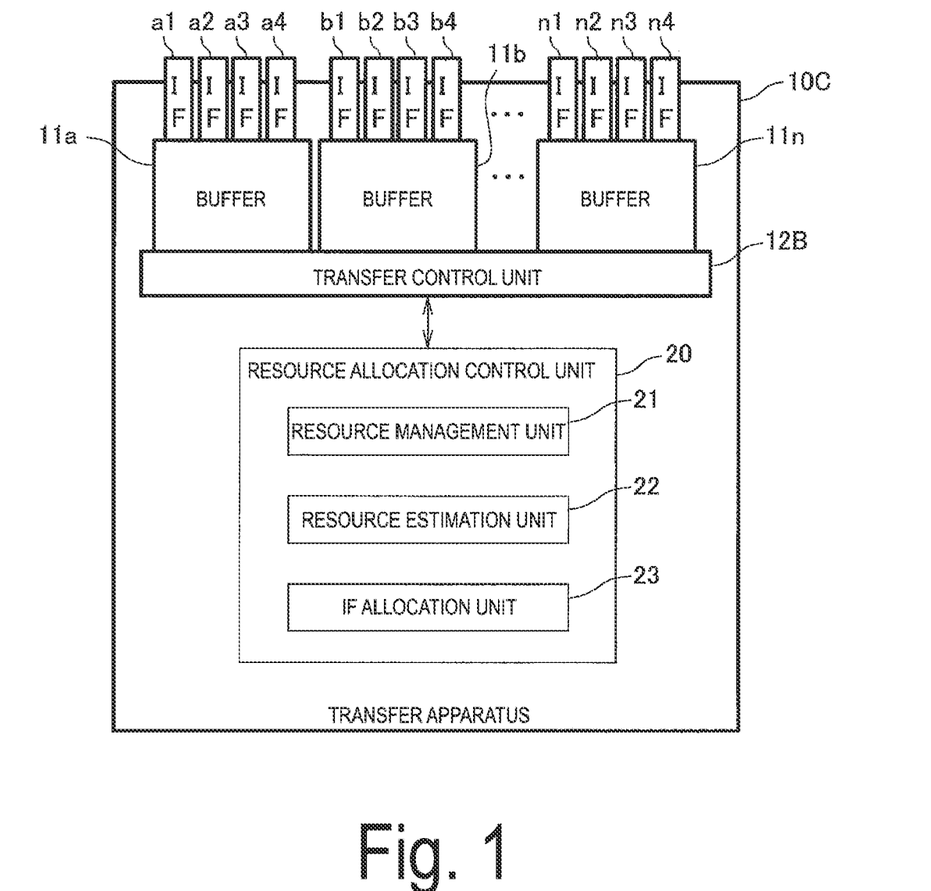
FIG. 1 is a block diagram illustrating a configuration of a transfer apparatus according to an embodiment of the present invention.

FIG. 1 is a block diagram illustrating a configuration of a transfer apparatus according to an embodiment of the present invention.

A transfer apparatus 10C illustrated in FIG. 1 is different from the transfer apparatus 10B (FIG. 6) in that a resource allocation control unit (also referred to as a control unit) 20 is provided in addition to the configuration of the transfer apparatus 10B. The control unit 20 performs control for allocating IFs to be used in accordance with the buffers 11a to 11n in response to a resource allocation command from a higher-order apparatus, which is not illustrated. The control unit 20 is configured to include a resource management unit 21, a resource estimation unit 22, and an IF allocation unit 23.

However, the buffers 11a to 11n are divided into a number of groups (n groups) such that the number is obtained by dividing all the IFs into a plurality of groups in accordance with dependence on connecting destinations, and the buffers 11a to 11n individually mount IFs in units of groups in advance. In other words, the buffer 11a mounts four IFs that are represented with the reference signs a1, a2, a3, and a4 and form one group a. The buffer 11b mounts four IFs that are represented with the reference signs b1, b2, b3, and b4 and form one group b. The buffer 11n mounts four IFs that are represented with the reference signs n1, n2, n3, and n4 and form one group n.

The IFs a1 to a4, b1 to b4, . . . n1 to n4 (also expressed as IF a1 to n4) in the groups a to n include unused IFs, and in a case in which the unused IFs are used, IF expansion of manually coupling wiring to an optical fiber or a metal cable of the network is performed. Also, IF connecting destination change of changing network connection of IFs to IFs of other buffers is also manually performed. Further, in a buffer (11a, for example), IF expansion/reduction of changing four IFs a1 to a4 in use, which belong to one group a, to three IFs a1 to a3 and changing the three IFs a1 to a3 in use to the four IFs a1 to a4 is also manually performed. Note that the IF expansion, the IF connecting destination change, and the IF expansion/reduction indicate the preprocessing described in the aspects.

However, the number of buffers 11a to 11n and the number of IFs a1 to n4 in each of the groups mounted in advance on each of the buffers 11a to 11n are fixed in advance and cannot be changed.

Next, the resource management unit (also referred to as a management unit) 21 performs management of detecting the traffic amount at the time of packet transfer in the IFs mounted on each of the buffers 11a to 11n to detect a use rate of the buffer capacity of each of the buffers 11a to 11n. However, the detection is performed as will be described below because the use rate cannot be detected directly. Also, the detection of the traffic amount is performed by a method of counting packets input to the IFs or the like.

Each of the buffers 11a to 11n is used such that, when the traffic amount of the IFs exceeds the maximum transfer capacity of the IFs, the packets corresponding to the exceeding traffic amount are buffered. Because the buffer capacity can be converted into the traffic amount, it is possible to detect the use rate of the buffer capacity by accumulating the exceeding traffic amount and comparing the accumulated value with the buffer capacity of one buffer.

When the traffic amount of the IFs becomes equal to or less than a predetermined value, the buffered packets are transferred via the IFs. It is thus possible to detect the use rate of the buffer capacity by detecting the traffic amount of the transferred packets, subtracting the traffic amount from the accumulated value, and comparing the accumulated value after the subtraction with the buffer capacity. The management unit 21 adapted to detect the use rate in this manner detects burst occurrence and packet loss occurrence as will be described below.

The management unit 21 detects, at a preset cycle, the traffic amount at the time of packet transfer for each of the IF groups a to n in the transfer apparatus 10C to detect whether a burst occurs and to detect whether a packet loss (loss) occurs, as will be described below. Furthermore, the management unit 21 stores each of the determined information regarding whether the burst occurs and information regarding whether the loss occurs in a storage unit (not illustrated), such as various memory devices or hard disk devices, in units of the IF groups. A packet loss can be detected by IFs because it occurs in the IFs in a case in which the buffers are full.

Figure 2:
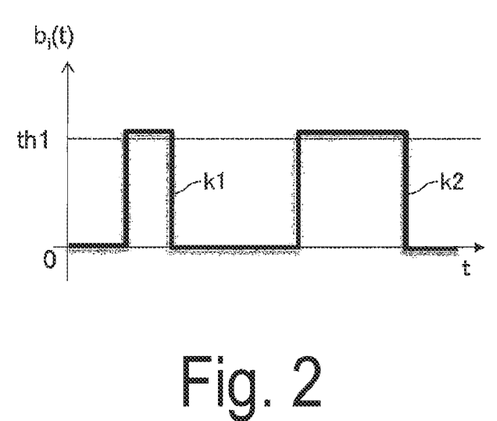
FIG. 2 is a diagram illustrating whether a burst occurs.

The detection of whether the burst occurs will be described with reference to FIG. 2. The vertical axis in FIG. 2 represents a burst occurrence amount $b_i(t)$ while the horizontal axis represents time t. i in $b_i(t)$ represents the consecutive numbers a1 to a4, b1 to b4, and n1 to n4 (see FIG. 1) of the IFs. A line th1 of a predetermined level represents a threshold value corresponding to the maximum transfer capacity of the IFs.

The management unit 21 detects the traffic amounts k1 and k2 of the packets of one IF for each of the IF groups a to n, detects that a burst occurs in a case in which the detected traffic amounts k1 and k2 exceed the threshold value th1, and stores the detected burst occurrence information "1" in the storage unit. Because a burst occurrence time t of k2 out of the traffic amounts k1 and k2 is as long as twice the burst occurrence time of the other, k1="1" and k2="1, 1" may be stored in accordance with the occurrence time t.

Also, the management unit 21 detects that no burst occurs (non-occurrence) in a case in which the detected traffic amounts are equal to or less than the threshold value th1 and stores the detected burst non-occurrence information "0" in the storage unit.

Figure 3:
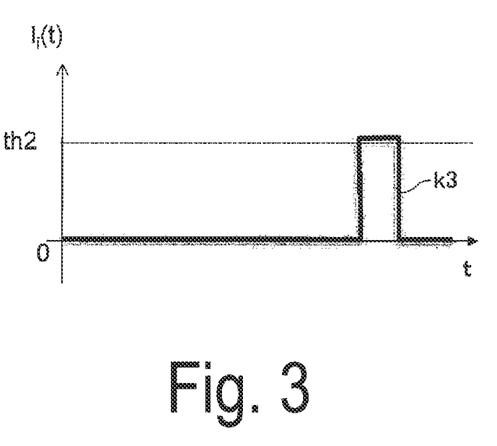
FIG. 3 is a diagram illustrating whether a packet loss occurs.

The detection of whether the packet loss occurs will be described with reference to FIG. 3. The vertical axis in FIG. 3 represents a packet loss occurrence amount $1_i(t)$ while the horizontal axis represents time t. i in $1_i(t)$ is the consecutive numbers a1 to a4, b1 to b4, and n1 to n4 of the IFs. A line th2 of a predetermined level is a threshold value for determining packet loss occurrence of the IFs.

When a packet loss k3 in which the count value of packet loss exceeds the threshold value th2 is detected in one IF of each of the IF groups a to n, the management unit 21 stores the detected packet loss occurrence information "1" in the storage unit. Also, the management unit 21 determines that no loss occurs in a case in which the aforementioned count value is equal to or less than the threshold value th2 and stores the determined packet loss non-occurrence information "0" in the storage unit.

However, any one of or both the burst occurrence amount $b_i(t)$ and the packet loss occurrence amount $1_i(t)$ will be referred to as traffic characteristics of $IF_i$.

A total value of the burst occurrence amount $b_i(t)$ of each of the IFs n1 to n4 of an IF group (IF group n, for example) will be defined as total traffic characteristics $b_n(t)$. The total traffic characteristics $b_n(t)$ in a case in which each of the IFs n1 to n4 of the IF group n is defined as i are represented by Equation (1) below.

[Math. 1]
$$b_n t = \sum_i b_i(t) \tag{1}$$

A total value of the packet loss occurrence amounts $1_i(t)$ of each of the IFs n1 to n4 of the IF group (IF group n, for example) will be defined as total traffic characteristics $l_n(t)$. Total traffic characteristics $l_n(t)$ in a case in which each of the IFs n1 to n4 of the IF group n is defined as i are represented by Equation (2) below.

[Math. 2]
$$l_n(t) = \sum_i l_i(t) \tag{2}$$

Next, the resource estimation unit (also referred to as an estimation unit) 22 estimates how the traffic characteristics of each of the IF groups a to n will change in a case in which IFs are expanded in the existing buffers 11a to 11n, for example, in a case in which the unused IF a4 of the buffer 11a is expanded in a used state, or an IF connecting destination is changed, for example, in a case in which a connecting destination is changed from the IF a1 of the buffer 11b to the IF b1 of the buffer 11b. Note that the estimation may also include estimation in a case in which the aforementioned IF expansion/reduction is performed. However, it is assumed that traffic characteristics of the IFs as targets of performing the IF expansion and the IF connecting destination change are known.

After an IF of an existing buffer (buffer 11n, for example) is expanded, or after the IF connecting destination is changed, the total traffic characteristics $b'_n(t)$ that are a total value of the burst occurrence amounts $b_i(t)$ of the IF group n are represented by Equation (3) below.

$$b'_n(t) = b_n(t) + b_{target}(t) \qquad (3)$$

However, "'" represents after the expansion of an IF or after the change of the IF connecting destination, "target" represents the IF that has been expanded or the IF of which the connecting target has been changed.

After an IF is expanded in an existing buffer (buffer $11n$, for example), or after the IF connecting destination is changed, the total traffic characteristics $l'_n(t)$ that are a total value of the loss occurrence amounts $1_i(t)$ of the IF group n are represented by Equation (4) below.

$$l'_n(t) = 1_n(t) + 1_{target}(t) \qquad (4)$$

Next, the IF allocation unit 23 allocates the IFs to be used in accordance with the buffers such that no packet loss occurs, in response to a resource allocation request from a higher-order apparatus or the like. This IF allocation processing will be described with reference to the flowchart illustrated in FIG. 4.

Figure 4:
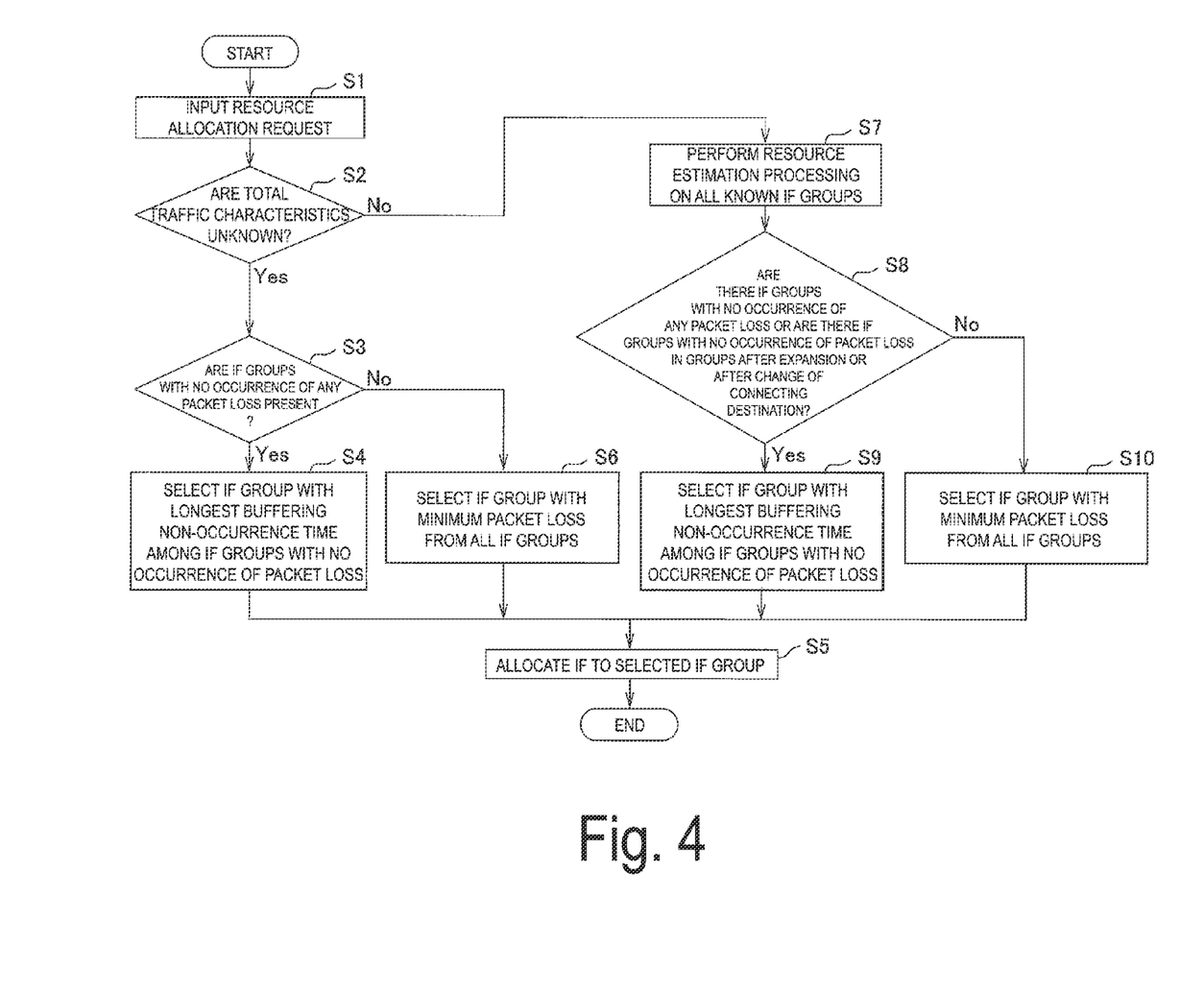
FIG. 4 is a flowchart for explaining IF allocation processing performed by the transfer apparatus according to the embodiment.

It is assumed that in Step S1 in FIG. 4, a resource allocation request (IF allocation request) from a higher-order apparatus or the like has been input to the IF allocation unit 23.

In Step S2, the IF allocation unit 23 determines whether $b_{target}(t)$ {see Equation (3)} and $1_{target}(t)$ {see Equation (4)} of the IF expansion or IF connecting destination change are unknown (known), in the total traffic characteristics $b'_n(t)$ of the IF group in accordance with the resource allocation request.

In a case in which the determination result is unknown (Yes), the IF allocation unit 23 determines whether IF groups with no occurrence of any packet loss are present in a unit time from among all the IF groups a to n in the transfer apparatus 10C in Step S3.

In a case in which the IF groups with no occurrence of any packet loss are present as the determination result (Yes), the IF allocation unit 23 selects an IF group n with the longest non-occurrence time of the buffering $B_n$ from among the IF groups with no occurrence of any loss in Step S4. In other words, the IF allocation unit 23 selects an IF group with the smallest total traffic characteristics $b_n(t)$ that are the total value of the burst occurrence amounts $b_i(t)$ of Equation (1) above. The selection is made by the IF allocation unit 23 comparing the information regarding whether the burst occurs stored in units of the IF groups in the storage unit.

A calculation equation of the buffering non-occurrence time $B_n$ in the aforementioned selected IF group n is represented by Equation (6) below when a function $f(x)$ that is Equation (5) below is defined.

[Math. 3]

$$f(x) = \begin{cases} 1 & (x = 0) \\ 0 & (x \neq 0) \end{cases} \qquad (5)$$

[Math. 4]

$$B_n = \int f(b'_n(t)) dt \qquad (6)$$

Next, in Step S5, the IF allocation unit 23 performs IF allocation designated through the resource allocation request on the IF group selected in Step S4.

On the other hand, it is assumed that no IF groups with no occurrence of any loss are present in the unit time (No) as the determination result in Step S3, in other words, it is assumed that losses have occurred in all the IF groups a to n. In the case in which the determination is No, the IF allocation unit 23 selects an IF group (assumed to be the IF group n) with a minimum number of occurrences of the loss, in other words, the IF group n with the longest loss non-occurrence time $L_n$, from among all the IF groups a to n in Step S6. The IF allocation unit 23 performs the IF allocation on the selected IF group n in Step S5.

A calculation equation of the loss non-occurrence time $L_n$ in the aforementioned selected IF group n is represented by Equation (7) below when a function $f(x)$ that is Equation (5) above is defined.

[Math. 5]

$$L_n = \int f(l'_n(t)) dt \qquad (7)$$

Here, integral intervals of Equations (6) and (7) above, that is, times as targets of the calculation may be set to any values. The reasons for setting the times $B_n$ and $L_n$ in Equations (6) and (7) will be described. Commonly, a case in which burst has occurred and buffering has been performed can be regarded as a symptom of a loss even if no packet loss has occurred. The present invention is thus designed such that, in a case in which an IF group with the most excellent traffic characteristics is selected from IF groups with no occurrence of any loss, an IF group on which buffering has not been performed that much, that is, an IF group that still has enough time until a loss occurs is selected.

Next, in a case in Which the determination result is "known" rather than "unknown" (No) in Step S2 described above, the estimation unit 22 performs resource estimation processing on all the known IF groups a to n Step S7.

The resource estimation unit is adapted to estimate how the traffic characteristics of each of the IF groups a to n will change in a case in which IFs are expanded in the existing buffers $11a$ to $11n$ in or IF connecting destination change is performed. For example, after the IF n4 of the buffer $11n$ is expanded, or after the connecting destination of the IF n4 is changed, the total traffic characteristics $b'_n(t)$ that are a total value of the burst occurrence amount $b_i(t)$ of each of the IF groups a to n are represented by Equation (3) above. Further, the total traffic characteristics $l'_n(t)$ that are a total value of the loss occurrence amounts $1_i(t)$ of each of the IF groups a to n are represented by Equation (4) above.

After such resource estimation processing, the IF allocation unit 23 determines whether IF groups with no occurrence of any packet loss are present or whether IF groups with no occurrence of any loss are present among the groups after the IFs are expanded or the IF connecting destination change is performed, in a unit time from among the IF groups a to n of the estimated traffic characteristics in Step S8.

In a case in which the IF groups with no occurrence of any packet loss or the IF groups with no occurrence of any loss among the groups after the IFs are expanded or the IF connecting destination change is performed are present as a determination result (Yes), the IF allocation unit 23 selects the IF group n with the longest buffering non-occurrence time $B_n$ from among the IF groups with no occurrence of any loss in Step S9. The IF allocation unit 23 performs the IF allocation on the selected IF group n in Step S5.

On the other hand in a case in which no IF groups with no occurrence of any loss are present, in other words, in a case in which losses have occurred in all the IF groups a to n (No) in the unit time as the determination result in Step S8 above, the IF allocation unit 23 selects the IF group n with a minimum number of occurrences of the loss, in other words, the IF group n with the longest loss non-occurrence time $L_n$ from among all the IF groups a to n in Step S10. The IF allocation unit 23 performs the IF allocation on the selected IF group n in Step S5.

Effects of Embodiment

Effects of the resource allocation processing performed by the transfer apparatus 10C according to this embodiment will be described.

The transfer apparatus 10C has the plurality of buffers 11a to 11n that are an identical number with the number groups a to n in which the plurality of packet transfer IFs a1 to n4 are divided into a smaller number of groups than the number of IFs, that mount the IFs a1 to 4, b1 to b4, . . . , n1 to n4 in units of groups, and that have buffer capacity defined in accordance with the number of mounted IFs. Packet transfer is performed to and from a network via the IFs of each of the buffers 11a to 11n, and when the traffic amount at the time of the packet transfer exceeds the maximum transfer capacity of the IFs, packets corresponding to the exceeding traffic amount are buffered in the buffers. Such a transfer apparatus 10C is configured to have features as described below.

(1) The transfer apparatus 10C includes the IF allocation unit 23. The IF allocation unit 23 is configured to select, in a case in which, from among all the IF groups in the transfer apparatus 10C, the IF groups in which any loss indicating packet discarding does not occur during the packet transfer in the IFs for a unit time are present, an IF group with the longest non-occurrence time of the buffering from among the IF groups with no occurrence of any loss and perform IF allocation of allocating the traffic of the packets to the IFs in the selected IF group.

With this configuration, it is possible to allocate IFs to be used in accordance with the buffers such that no packet loss occurs, in a case in which the transfer apparatus 10C that performs the packet transfer includes as many buffers with the grouped IFs mounted in units of groups thereon as the number of groups.

(2) The aforementioned IF allocation is the processing of allocating the traffic to the IFs after the preprocessing is executed. The preprocessing is any one of the IF expansion of bringing the unused IFs mounted on the buffer of the selected IF group into a used state, IF connecting destination change of changing the IFs connected to the network to the IFs of another buffer, and IF expansion/reduction of increasing or reducing the IFs in use in the selected buffer.

With this configuration, it is possible to allocate IFs to be used in accordance with the buffers, which are targets of the IF allocation on which the preprocessing that is any of the IF expansion, the IF connecting destination change, and the IF expansion/reduction has been performed.

(3) The transfer apparatus 10C further includes the management unit 21. The management unit 21 detects whether a burst occur, which is occurrence of burst traffic when the traffic amount at the time of the packet transfer in the IFs exceeds the maximum transfer capacity of the IFs and stores the detected information regarding whether the burst occurs in a storage unit in units of the IF groups in association with the time information regarding whether the burst occurs. Also, the management unit 21 performs the processing of detecting whether the loss occurs at the time of the packet transfer in the IFs and storing the detected information regarding whether the loss occurs in the storage unit in units of the IF groups in association with the time information regarding whether the loss occurs. At this time, the IF allocation unit 23 is configured to regard and select, when detecting the presence of the IF groups with no occurrence of any loss based on the information, which is stored in the storage unit, regarding whether the loss occurs, an IF group with the minimum number of occurrences of the burst from among the IF groups with no occurrence of any loss as the IF group with the longest non-occurrence time of the buffering, based on the information regarding whether the burst occurs.

With this configuration, it is possible to regard and select the IF group with the minimum number of occurrences of the burst from among the IF groups with no occurrence of any loss as the IF group with the longest non-occurrence time of the buffering, based on the information regarding whether the loss occurs and the information regarding whether the burst occurs, with which the time information acquired by the management unit 21 is associated. Calculation for the selection can be achieved with a simple calculation equation because an algorithm for the selection is simple. It is thus possible to perform the IF allocation such that a loss can be prevented in advance with the simple calculation when the IF allocation is performed.

(4) The IF allocation unit 23 is configured to perform, in a case in which, from among all the IF groups in the transfer apparatus 10C, the IF groups in which a loss does not occur during the packet transfer in the IFs for a unit time are not present, the IF allocation by selecting an IF group with the minimum number of occurrences of the loss from among all the IF groups.

With this configuration, it is possible to allocate IFs to be used in accordance with the buffers such that a packet loss is minimized.

(5) The transfer apparatus 10C further includes the estimation unit 22. The estimation unit 22 estimates the information regarding whether the burst occurs and the information whether the loss occurs, with which the aforementioned time information is associated, from the traffic characteristics of each of the IF groups after the preprocessing is executed. At this time, the IF allocation unit 23 is configured to regard and select, when detecting the presence of the IF groups with no occurrence of any loss from among the IF groups with the traffic characteristics estimated by the estimation unit 22, the IF group with the minimum number of occurrences of the burst from among the IF groups with no occurrence of any loss as the IF group with the longest non-occurrence time of the buffering.

With this configuration, it is possible to regard and select the IF group with the minimum number of occurrences of the burst from among the IF groups with no occurrence of any loss as the IF group with the longest non-occurrence time of the buffering when the presence of the IF groups with no occurrence of any loss is detected from among the IF groups with the traffic characteristics estimated by the estimation unit 22. Calculation for the selection can be achieved with a simple calculation equation because an algorithm for the selection is simple. It is thus possible to perform the IF allocation such that a loss can be prevented in advance with simple estimation calculation when the IF allocation is performed.

(6) The IF allocation unit 23 is configured to perform, in a case in which the presence of the IF groups with no occurrence of any loss is not detected from among the IF groups with the traffic characteristics estimated by the estimation unit 22, the IF allocation by selecting the IF group with the minimum number of occurrences of the loss from among all the estimated IF groups.

With this configuration, it is possible to allocate IFs to be used in accordance with the buffers such that a packet loss is minimized from among the IF groups with the traffic characteristics estimated by the estimation unit 22.

In addition, a specific configuration can be appropriately changed without departing from the gist of the present invention.

REFERENCE SIGNS LIST

10C Transfer apparatus
11a to 11n Buffer
a1 to a4, b1 to b4, n1 to n4 IF (interface)
12B Transfer control unit
20 Resource allocation control unit
21 Resource management unit
22 Resource estimation unit
23 IF allocation unit

The invention claimed is:

1. A transfer apparatus comprising a plurality of buffers, the plurality of buffers being an identical number with a number of interface (IF) groups, the IF groups being obtained by grouping a plurality of interfaces (IFs) for packet transfer in units of a number that is smaller than the number of the plurality of IFs, each of the plurality of buffers mounting the number of IFs in units of groups, buffer capacity of each of the plurality of buffers being defined in accordance with the number of mounted IFs in units of groups, the transfer apparatus performing packet transfer to and from a network via the mounted IFs in units of groups of each of the plurality of buffers, the transfer apparatus performing buffering packets corresponding to an exceeding traffic amount in a buffer of the plurality of buffers when a traffic amount at a time of the packet transfer exceeds maximum transfer capacity of the IFs in units of groups, the transfer apparatus comprising:

an IF allocation unit, including one or more processors, configured to select, in a case in which, from the IF groups of the transfer apparatus, the IF groups in which a loss indicating packet discarding does not occur during the packet transfer in the IFs in units of groups for a unit time are present, an IF group with a longest non-occurrence time of the buffering from among the IF groups with no occurrence of any loss and perform IF allocation of allocating traffic of packets to IFs in units of groups in the IF group that is selected.

2. The transfer apparatus according to claim 1, wherein the IF allocation unit is configured to allocate the traffic to the IFs in units of groups after preprocessing is executed, the preprocessing being any one of, IF expansion of bringing unused IFs in units of groups mounted on a buffer of the IF group that is selected into a used state, IF connecting destination change of changing the IFs in units of groups connected to the network to the IFs in units of groups of another buffer, and IF expansion or reduction of increasing or reducing the IFs in units of groups in use in the buffer that is selected.

3. The transfer apparatus according to claim 1, further comprising:

a management unit, including one or more processors, configured to:

detect whether a burst occurs, namely whether burst traffic occurs when the traffic amount at the time of the packet transfer in the IFs in units of groups exceeds the maximum transfer capacity of the IFs in units of groups, store detected information regarding whether the burst occurs in a storage unit in units of the IF groups in association with time information regarding whether the burst occurs, detect whether the loss occurs at the time of the packet transfer in the IFs in units of groups, and store detected information regarding whether the loss occurs in a storage unit in units of the IF groups in association with time information regarding whether the loss occurs, wherein the IF allocation unit regards and selects, when detecting presence of IF groups with no occurrence of any loss based on the information, which is stored in the storage unit, regarding whether the loss occurs, an IF group with a minimum number of occurrences of the burst from among the IF groups with no occurrence of any loss as the IF group with a longest non-occurrence time of the buffering, based on the information regarding whether the burst occurs.

4. The transfer apparatus according to claim 1, wherein the IF allocation unit performs, in a case in which, from among all the IF groups in the transfer apparatus, IF groups in which a loss does not occur during the packet transfer in the IFs in units of groups for a unit time are not present, the IF allocation by selecting an IF group with a minimum number of occurrences of the loss from among all the IF groups.

5. The transfer apparatus according to claim 2, further comprising an estimation unit, including one or more processors, configured to estimate information regarding whether the burst occurs, with which time information regarding whether the burst occurs is associated, and information regarding whether the loss occurs, with which time information regarding whether the loss occurs is associated, from traffic characteristics of each of the IF groups after the preprocessing is executed, wherein the IF allocation unit regards and selects, when detecting presence of IF groups with no occurrence of any loss from among the IF groups with the traffic characteristics estimated by the estimation unit, an IF group with a minimum number of occurrences of the burst from among the IF groups with no occurrence of any loss as an IF group with a longest non-occurrence time of the buffering.

6. The transfer apparatus according to claim 5, wherein the IF allocation unit performs, in a case in which the presence of the IF groups with no occurrence of any loss is not detected from among the IF groups with the traffic characteristics estimated by the estimation unit, the IF allocation by selecting an IF group with a minimum number of occurrences of the loss from among all the estimated IF groups.

7. A resource allocation method performed by a transfer apparatus comprising a plurality of buffers, the plurality of buffers being an identical number with a number of interface (IF) groups, the IF groups being obtained by grouping a plurality of IFs for packet transfer in units of a number that is smaller than the number of the plurality of IFs, each of the plurality of buffers mounting the number of IFs in units of groups, buffer capacity of each of the plurality of buffers being defined in accordance with the number of mounted IFs in units of groups, the transfer apparatus performing packet transfer to and from a network via the mounted IFs in units of groups of each of the plurality of buffers, the transfer apparatus performing buffering packets corresponding to an exceeding traffic amount in a buffer of the plurality of buffers when a traffic amount at time of the packet transfer exceeds maximum transfer capacity of the IFs in units of groups, the resource allocation method comprising:
- detecting, from the IF groups of the transfer apparatus, whether IF groups in which a loss indicating packet discarding does not occur during the packet transfer in the IFs in units of groups for a unit time are present;
- selecting, in a case in which the IF groups are detected to be present, an IF group with a longest non-occurrence time of the buffering from among the IF groups with no occurrence of any loss; and
- performing IF allocation of allocating traffic of packets to IFs in units of groups in the IF group that is selected.

8. The resource allocation method according to claim 7, further comprising, allocating by the IF allocation unit, the traffic to the IFs in units of groups after preprocessing is executed, the preprocessing being any one of, IF expansion of bringing unused IFs in units of groups mounted on a buffer of the IF group that is selected into a used state, IF connecting destination change of changing the IFs in units of groups connected to the network to the IFs in units of groups of another buffer, and IF expansion or reduction of increasing or reducing the IFs in units of groups in use in the buffer that is selected.

9. The resource allocation method according to claim 7, further comprising:
- detecting, by a management unit, whether a burst occurs, namely whether burst traffic occurs when the traffic amount at the time of the packet transfer in the IFs in units of groups exceeds the maximum transfer capacity of the IFs in units of groups,
- storing detected information regarding whether the burst occurs in a storage unit in units of the IF groups in association with time information regarding whether the burst occurs,
- detecting whether the loss occurs at the time of the packet transfer in the IFs in units of groups, and
- storing detected information regarding whether the loss occurs in a storage unit in units of the IF groups in association with time information regarding whether the loss occurs, wherein the IF allocation unit regards and selects, when detecting presence of IF groups with no occurrence of any loss based on the information, which is stored in the storage unit, regarding whether the loss occurs, an IF group with a minimum number of occurrences of the burst from among the IF groups with no occurrence of any loss as the IF group with a longest non-occurrence time of the buffering, based on the information regarding whether the burst occurs.

10. The resource allocation method according to claim 7, further comprising, performing, by the IF allocation unit, in a case in which, from among all the IF groups in the transfer apparatus, IF groups in which a loss does not occur during the packet transfer in the IFs in units of groups for a unit time are not present, the IF allocation by selecting an IF group with a minimum number of occurrences of the loss from among all the IF groups.

11. The resource allocation method according to claim 10, further comprising
- estimating, by an estimation unit information regarding whether the burst occurs, with which time information regarding whether the burst occurs is associated, and information regarding whether the loss occurs, with which time information regarding whether the loss occurs is associated, from traffic characteristics of each of the IF groups after the preprocessing is executed,
- wherein the IF allocation unit regards and selects, when detecting presence of IF groups with no occurrence of any loss from among the IF groups with the traffic characteristics estimated by the estimation unit, an IF group with a minimum number of occurrences of the burst from among the IF groups with no occurrence of any loss as an IF group with a longest non-occurrence time of the buffering.

12. The resource allocation method according to claim 10, further comprising, performing, by the IF allocation unit, in a case in which the presence of the IF groups with no occurrence of any loss is not detected from among the IF groups with the traffic characteristics estimated by the estimation unit, the IF allocation by selecting an IF group with a minimum number of occurrences of the loss from among all the estimated IF groups.

* * * * *